(12) United States Patent
Wang et al.

(10) Patent No.: US 12,455,275 B2
(45) Date of Patent: *Oct. 28, 2025

(54) NON-ENZYMATIC SENSOR ELEMENT WITH SELECTIVITY AND NON-ENZYMATIC SENSOR

(71) Applicant: National Tsing Hua University, Hsinchu (TW)

(72) Inventors: Hsiang-Yu Wang, Hsinchu (TW); Shih-Hao Lin, New Taipei (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 608 days.

This patent is subject to a terminal disclaimer.

(21) Appl. No.: 17/945,229

(22) Filed: Sep. 15, 2022

(65) Prior Publication Data

US 2023/0273184 A1 Aug. 31, 2023

(30) Foreign Application Priority Data

Feb. 25, 2022 (TW) .................................. 111107140

(51) Int. Cl.
*G01N 33/487* (2006.01)
*G01N 33/53* (2006.01)

(52) U.S. Cl.
CPC . *G01N 33/48707* (2013.01); *G01N 33/48785* (2013.01); *G01N 33/5308* (2013.01)

(58) Field of Classification Search
CPC ....... G01N 33/48707; G01N 33/48785; G01N 33/5308
See application file for complete search history.

(56) References Cited

U.S. PATENT DOCUMENTS 12,234,569 B2 * 2/2025 Wang ...................... C25D 5/18
2012/0264646 A1 10/2012 Link et al.

FOREIGN PATENT DOCUMENTS

| CN | 1322299 A | 11/2001 |
| CN | 111656179 A | 9/2020 |
| TW | 200519379 A | 6/2005 |

OTHER PUBLICATIONS

Dhara, Highly sensitive and wide-range nonenzymatic disposable glucose sensor based on a screen printed carbon electrode modified with reduced graphene oxide and Pd—CuO nanoparticles, Micochim Acta (2015)182:2183-2192. (Year: 2015).*

(Continued)

*Primary Examiner* — Samuel P Siefke
(74) *Attorney, Agent, or Firm* — Lippes Mathias LLP (57) ABSTRACT

A non-enzymatic sensor element with selectivity is used to sense a concentration of a target analyte and includes a substrate and an electrode assembly. The electrode assembly is connected to the substrate and includes a working electrode, a reference electrode and an auxiliary electrode. The working electrode includes a conductive layer, a catalyst layer and a selective layer. The conductive layer is connected to the substrate. The catalyst layer is connected to the conductive layer and includes a catalyst for oxidizing the target analyte. The selective layer is connected to the catalyst layer and includes an ionic liquid having a high affinity with the target analyte. The target analyte passes through the selective layer and contacts with the catalyst layer, and the target analyte is oxidized by the catalyst.

10 Claims, 5 Drawing Sheets

(56) References Cited

OTHER PUBLICATIONS

Sara Hooshmand, et al., "Microfabricated disposable nanosensor based on CdSe quantum dot/ionic liquid-mediated hollow fiber-pencil graphite electrode for simultaneous electrochemical quantification of uric acid and creatinine in human samples", Analytica Chimica Acta 972, 2017, pp. 28-37.

Edgar Nagles, et al, "Evaluation of the usefulness of a novel electrochemical sensor in detecting uric acid and dopamine in the presence of ascorbic acid using a screen-printed carbon electrode modified single walled carbon nanotubes and ionic liquids", Electrochimica Acta 258, 2017 pp. 512-523.

* cited by examiner

NON-ENZYMATIC SENSOR ELEMENT WITH SELECTIVITY AND NON-ENZYMATIC SENSOR

RELATED APPLICATIONS

This application claims priority to Taiwan Application Serial Number 111107140, filed Feb. 25, 2022, which is herein incorporated by reference.

BACKGROUND

Technical Field

The present disclosure relates to a non-enzymatic sensor element and a non-enzymatic sensor. More particularly, the present disclosure relates to a non-enzymatic sensor element with selectivity and a non-enzymatic sensor.

Description of Related Art

In the field of clinical medicine, detecting the concentration of organic substances in the human body can be used to determine the signs of diseases and the state of the human body, and can be further applied in the fields of sports management and disease detection, etc. The sensing element can be divided into the types of enzymatic sensing and non-enzymatic sensing.

Non-enzymatic sensor usually uses metal or conductive polymer as catalyst to catalyze the target analyte and generate a signal. The non-enzymatic sensing element has the advantages of better stability, unaffected by environmental factors and higher processability than the enzymatic sensing element. However, the aforementioned catalysts can catalyze various substances, so the non-enzymatic sensor is not selective when sensing samples containing various substances, which is one of the great disadvantages of the non-enzymatic sensor.

Therefore, developing a non-enzymatic sensing element and a non-enzymatic sensor with selectivity has become a goal of the related fields.

SUMMARY

According to one aspect of the present disclosure, a non-enzymatic sensor element with selectivity is used to sense a concentration of a target analyte and includes a substrate and an electrode assembly. The electrode assembly is connected to the substrate and includes a working electrode, a reference electrode and an auxiliary electrode. The working electrode includes a conductive layer, a catalyst layer and a selective layer. The conductive layer is connected to the substrate. The catalyst layer is connected to the conductive layer and includes a catalyst for oxidizing the target analyte. The selective layer is connected to the catalyst layer and includes an ionic liquid having a high affinity with the target analyte. The target analyte passes through the selective layer and contacts with the catalyst layer, and the target analyte is oxidized by the catalyst.

According to another aspect of the present disclosure, a non-enzymatic sensor includes the non-enzymatic sensor element with selectivity according to the aforementioned aspect and a current sensor. The non-enzymatic sensor element with selectivity is for oxidizing a target analyte and generating a current. The current sensor is electrically connected to the non-enzymatic sensor element with selectivity and for converting the current to a detection result.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
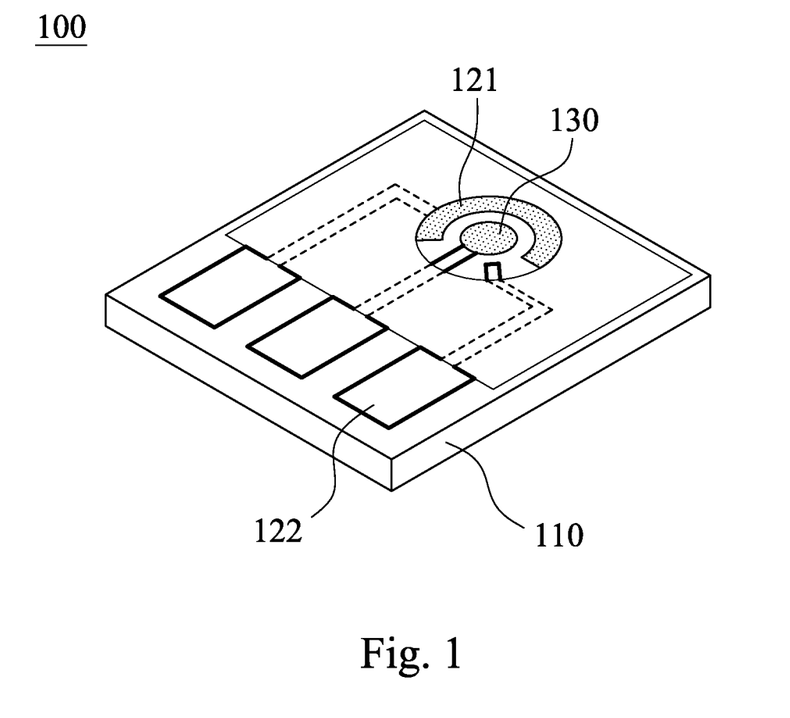
FIG. 1 is a schematic view of a non-enzymatic sensor element with selectivity according to an embodiment of the present disclosure.
Figure 2:
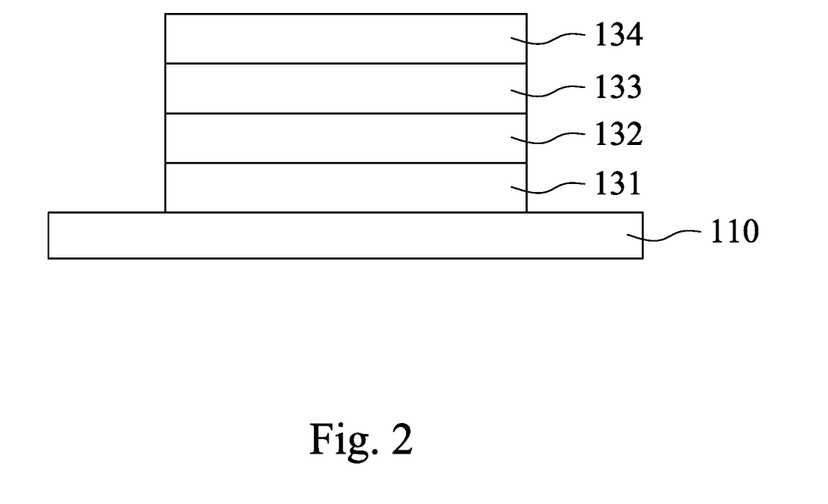
FIG. 2 is a sectional schematic view of a working electrode of the non-enzymatic sensor element with selectivity of FIG. 1.

Please refer to FIGS. 1 and 2. FIG. 1 is a schematic view of a non-enzymatic sensor element with selectivity 100 according to an embodiment of the present disclosure. FIG. 2 is a sectional schematic view of a working electrode 130 of the non-enzymatic sensor element with selectivity 100 of FIG. 1. As shown in FIG. 1, the non-enzymatic sensor element with selectivity 100 includes a substrate 110 and an electrode assembly (the reference number is omitted). The electrode assembly is connected to the substrate 110. The electrode assembly includes a working electrode 130, a reference electrode 121 and an auxiliary electrode 122. In detail, the working electrode 130 includes a conductive layer 131, a catalyst layer 132 and a selective layer 133. The conductive layer 131 is connected to the substrate 110. The catalyst layer 132 is connected to the conductive layer 131. The selective layer 133 is connected to the catalyst layer 132.

Specifically, the non-enzymatic sensor element with selectivity 100 is used to sense a concentration of a target analyte of a biological sample. The biological sample can be saliva, sweat or blood, etc., which contains various organic molecules. The target analyte can be lactic acid, uric acid or miRNA. With the configuration of the selective layer 133, the non-enzymatic sensor element with selectivity 100 of the present disclosure can be especially selective for one of the substances in the biological sample, and the concentration and content of the substance can be detected. Therefore, the problem that the general non-enzymatic sensors are not selective can be improved, and the applicability of the non-enzymatic sensing field can be also enhanced. The structure configuration and effect of the non-enzymatic sensor element with selectivity 100 will be described in detail below.

In the embodiment of FIG. 1, the substrate 110 can be a flexible polymer, such as polyimide (PI), to provide the flexibility of the non-enzymatic sensor element with selectivity 100. Therefore, the non-enzymatic sensor element with selectivity 100 can be applied in various detecting environments. The present disclosure will not be limited thereto.

The conductive layer 131 can include a metal, a conductive polymer or other conductive materials. The reference electrode 121 can include a silver chloride compound. The catalyst layer 132 includes a catalyst. The catalyst is used for oxidizing the target analyte. The catalyst can be a metal, a compound of the metal or a conductive polymer. The metal can be Ni or a precious metal, such as Au or Pt. The compound of the metal can be a metal hydroxide or a metal oxide, such as CuO, NiO or ZnO. The conductive polymer can be polyacetylene (PA), polypyrrole (PPy), polythiophene (PT) or polyaniline (PANI).

The selective layer 133 includes an ionic liquid. Specially, the ionic liquid has a high affinity with the target analyte. The target analyte passes through the selective layer 133 and contacts with the catalyst layer 132, and the target analyte is oxidized by the catalyst. Therefore, the non-enzymatic sensor element with selectivity 100 can be achieved according to the affinity of the ionic liquid with the target analyte.

Specifically, the biological sample includes various organic molecules, wherein the biological sample contains the target analyte and other substances. In the non-enzymatic sensor element with selectivity 100 of the present disclosure, the affinity between the ionic liquid of the selective layer 133 and the target analyte is greater than the affinity between the ionic liquid of the selective layer 133 and other substances. Accordingly, the extraction function can be established by the selective layer 133. A specific target analyte can be extracted by the ionic liquid of the selective layer 133. Even if other substances can react with the catalyst of the catalyst layer 132, they cannot pass through the selective layer 133 and contact with the catalyst. Therefore, the interference of other substances can be excluded.

Due to the affinity of the ionic liquid with a specific substance, only the target analyte can pass through the selective layer 133 and react with the catalyst of the catalyst layer 132, and then be sensed. Therefore, the non-enzymatic sensor element with selectivity 100 of the present disclosure can have selectivity. The non-enzymatic sensor element with selectivity 100 can be used to select a specific target analyte in the biological sample with multiple substances for concentration and content sensing. Further, the non-enzymatic sensor element with selectivity 100 of the present disclosure has the advantages of being unaffected by environmental factors, not easily losing activity and having a wide detection range.

In detail, a chemical structure of the ionic liquid of the non-enzymatic sensor element with selectivity 100 has an attaching segment and an extracting segment. The attaching segment is connected with the catalyst layer 132 through a covalent bond, wherein the attaching segment has an ethylenic bond. Therefore, the ionic liquid can be stably attached to the catalyst layer 132. The extracting segment forms the high affinity with the target analyte, and the selective layer 133 can establish the extraction function. The extracting segment can include a phosphorus compound, an amine compound or an imidazole compound. The phosphorus compound has high affinity with the lactic acid. The amine compound has high affinity with the uric acid. The imidazole compound has high affinity with the miRNA. Specially, the chemical structure of the extracting segment can be designed through the selection of molecules, the design of the three-dimensional structure and the adjustment of the length of the carbon chain, so that the extracting segment can form the high affinity with the corresponding target analyte.

Therefore, by selecting different ionic liquids, different molecules can be sensed. The chemical structure of the ionic liquid of the present disclosure can be designed and synthesized according to the characteristics of the target analyte, so that the ionic liquid has high affinity with the target analyte, but the present disclosure will not be limited thereto.

In detail, in the biological sample, the target analyte has the greatest affinity with the ionic liquid, so the target analyte preferentially passes through the selective layer 133. The extraction function is achieved by the Tr-electrons of the benzene ring of the ionic liquid that is attractive to the target analyte. The ionic liquid is composed of anion group and cation group bonded by ionic bonds. The three-dimensional structure of the ionic liquid causes the uneven distribution of the electrostatic force, so that the ionic liquid and the target analyte have a specific electrostatic force to adsorb, and the extraction effect can be achieved. Further, the ionic liquid can form a complex with the target analyte, so that the target analyte can contact the catalyst layer 132.

As shown in FIG. 2, the working electrode 130 can include a proton exchange membrane 134 which is connected to the selective layer 133. The exchange membrane 134 can be Nafion membrane. The exchange membrane 134 can protect the selective layer 133 from detaching from the catalyst layer 132.

In a manufacturing method of the non-enzymatic sensor element with selectivity 100, the conductive layer 131, the catalyst layer 132 and the selective layer 133 are sequentially formed on the substrate 110. The conductive layer 131 and the catalyst layer 132 can be processed by appropriate modified to achieve better sensing effect.

A printing step is performed first. In the printing step, the conductive layer 131 is formed on the substrate 110, In detail, a wire pattern is printed on the substrate 110 with carbon paste containing conductive substances by screen printing, and the auxiliary electrode 122 and the working electrode 130 is formed.

Then, an electrode modifying step is performed. In the electrode modifying step, the calcium carbonate powder in the carbon slurry is removed to form a porous electrode. In detail, the electrode assembly is immersed in 1M sulfuric acid, and the surface of the electrode assembly is cleaned by cyclic voltammetry (CV) to remove the dirt on the electrode surface. The graphene oxide is directly electrodeposited and reduced on the electrode surface to improve the performance of the electrode assembly. Next, the catalyst is electroplated on the conductive layer 131 to form the catalyst layer 132.

Specially, the ionic liquid of the selective layer 133 can be connected to the catalyst layer 132 in an electrografting manner. In detail, in the electrografting operation, a voltage is applied to break the bond of the attaching segment of the ionic liquid and make it contact with the surface of the catalyst layer 132 to form a covalent bond with the surface of the catalyst layer 132. Therefore, the selective layer 133 can be more uniformly and firmly attached to the surface of the catalyst layer 132, and the selective layer 133 can be effectively prevented from falling off from the catalyst layer 132.

It should be mentioned that the manufacturing method of the non-enzymatic sensor element with selectivity 100 and the method of electrode modification can be adjusted and selected according to the application requirements, and the present disclosure will not be limited thereto.

Figure 3:
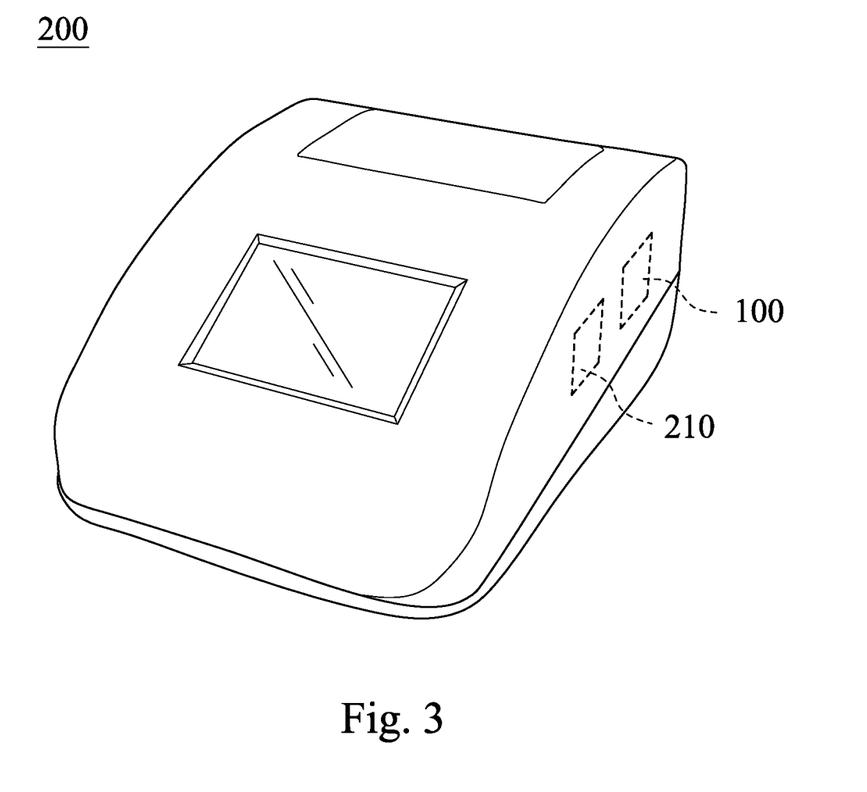
FIG. 3 is a schematic view of a non-enzymatic sensor according to another embodiment of the present disclosure.

Please refer to FIG. 3. FIG. 3 is a schematic view of a non-enzymatic sensor 200 according to another embodiment of the present disclosure. The non-enzymatic sensor 200 includes the non-enzymatic sensor element with selectivity 100 and a current sensor 210.

In detail, the non-enzymatic sensor element with selectivity 100 is used for oxidizing the target analyte and generating a current. The current sensor 210 is electrically connected to the non-enzymatic sensor element with selectivity 100 and is for converting the current to a detection result. The concentration of the target analyte in the biological sample can be known by the strength of the current, and then the content and the concentration of the target analyte can be obtained.

It is worth to mention that the detection result in the non-enzymatic sensor 200 is a single signal. In general, when a sensor detects a biological sample containing multiple substances, multiple signals are generated, and the signals need to be further filtered to obtain the signal of the specific substance. However, in the non-enzymatic sensor 200 of the present disclosure, by the setting of the selective layer 133, only a single and specific target analyte can pass through the selective layer 133 and contact the catalyst layer 132, so that only the target analyte will be sensed and a single signal will be generated. Therefore, interference from other substances can be excluded. The non-enzymatic sensor 200 of the present disclosure can be faster and more convenient in signal interpretation than the general sensor.

Reference will now be made in detail to the present embodiments of the present disclosure, examples of which are illustrated in the accompanying drawings.

In order to more specifically describe the non-enzymatic sensor element with selectivity 100 of the present disclosure, Example 1, Example 2 and Example 3 are presented. Example 1, Example 2 and Example 3 are used for detecting different target analytes, respectively. Example 1, Example 2 and Example 3 have different selective layer and catalyst layer, respectively. The preparation method of each example will be described in detail below.

Example 1 is used for sensing the lactic acid. In Example 1, the catalyst of the catalyst layer is Ni(OH)$_2$. The electrolyte is NaOH. The ionic liquid of the selective layer is trihexyl(4-vinylbenzyl)phosphonium chloride and has a structure represented by formula (I):

formula (I)

The synthesis method of the ionic liquid of Example 1 is described as follows. Under nitrogen, 4-chloromethylstyrene (3.4 g, 22 mmol) and trihexylphosphine (7.02 g, 24.4 mmol) are dissolved in 10 mL of hexane. The mixture is stirred overnight (12 hours-18 hours) at 60° C. Use ethyl acetate to separate the ionic liquid from hexane, wherein the ionic liquid can dissolve in ethyl acetate. The ethyl acetate is removed and evaporated by using a pump at 70° C. Thus, the ionic liquid powder is obtained.

In the preparation method of the non-enzymatic sensor element with selectivity of Example 1, the conductive layer and the catalyst layer are sequentially formed on the substrate. Next, the aforementioned ionic liquid powder is mixed with 2 mL of dimethyl sulfoxide (DMSO) to obtain a selective layer solution. The ionic liquid is electrografted on the catalyst layer by amperometry, i-t curve, to form the selective layer. In the electrografting operation, the solution is the selective layer solution, the reference electrode is a commercial calomel electrode (vs. 3M KCl), the auxiliary electrode is a platinum wire, and the scan voltage is set to −1.7 V for 10 seconds.

Example 2 is used for sensing the uric acid. In Example 2, the catalyst of the catalyst layer is Ni. The electrolyte is phosphate buffered saline (PBS) (0.1M). The ionic liquid of the selective layer is N-vinylbenzylimidazolium chloride and has a structure represented by formula (II):

formula (II)

The synthesis method of the ionic liquid of Example 2 is described as follows. Under nitrogen, 4-chloromethylstyrene (19.5 ml, 139 mmol) and N-ethyl imidazole (0.720975 g, 125 mmol) are dissolved in 30 mL of hexane. The mixture was stirred overnight (12 hours 18 hours) at 50° C. Use DI water to separate the ionic liquid from hexane, wherein the ionic liquid can dissolve in DI water. The DI water is removed and evaporated by using a pump at 70° C. Thus, the ionic liquid powder is obtained.

In the preparation method of the non-enzymatic sensor element with selectivity of Example 2, the conductive layer and the catalyst layer are sequentially formed on the substrate. Next, the aforementioned ionic liquid powder (0.1076 g) is mixed with Dimethyl sulfoxide (DMSO) (2 mL) to obtain a selective layer solution. The ionic liquid is electrografted on the catalyst layer by amperometry, i-t curve, to form the selective layer. In the electrografting operation, the solution is the selective layer solution, the reference electrode is a commercial calomel electrode (vs. 3M KCl), the auxiliary electrode is a platinum wire, and the scan voltage is set to −1.7 V for 10 seconds.

Example 3 is used for sensing the miRNA. In Example 3, the catalyst of the catalyst layer is reduced graphene oxide (RGO). The electrolyte is phosphate buffered saline (PBS). The ionic liquid of the selective layer is trioctyl(4-vinylbenzyl)ammonium chloride and has a structure represented by formula (III):

formula (III)

The synthesis method of the ionic liquid of Example 3 is described as follows. Under nitrogen, 4-chloromethylstyrene (3.4 g, 22 mmol) and trioctylamine (8.6 g, 24.4 mmol) are dissolved in 10 mL of hexane. The mixture is stirred overnight (12 hours~18 hours) at 60° C. Use ethyl acetate to separate the ionic liquid from hexane, wherein the ionic liquid can dissolve in ethyl acetate. The ethyl acetate is removed and evaporated by using a pump at 70° C. Thus, the ionic liquid powder is obtained.

In the preparation method of the non-enzymatic sensor element with selectivity of Example 3, the conductive layer and the catalyst layer are sequentially formed on the substrate. Next, the aforementioned ionic liquid powder (0.1922 g) is mixed with 2 mL of dimethyl sulfoxide (DMSO) to obtain a selective layer solution. The ionic liquid is electrografted on the catalyst layer by amperometry, i-t curve, to form the selective layer. In the electrografting operation, the solution is the selective layer solution, the reference electrode is a commercial calomel electrode (vs. 3M KCl), the auxiliary electrode is a platinum wire, and the scan voltage is set to −1.7 V for 10 seconds.

<Performance Measurement>

In order to more clearly illustrate the effect of the non-enzymatic sensor element with selectivity of the present disclosure, Example 1, Example 2 and Example 3 detect the lactic acid, the uric acid and the miRNA, respectively.

Figure 4:
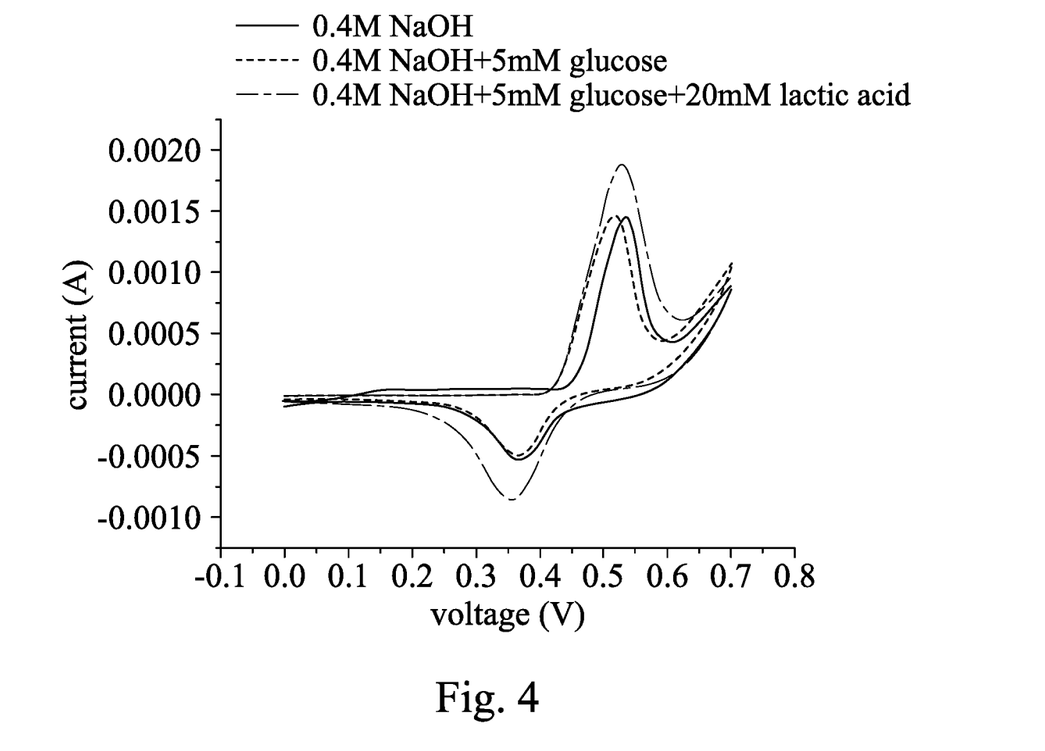
FIG. 4 is a CV graph for the lactic acid detected by Example 1 of the present disclosure.

Please refer to FIG. 4. FIG. 4 is a CV graph for the lactic acid detected by Example 1 of the present disclosure. In FIG. 4, a sample containing NaOH, a sample containing NaOH and 5 mM glucose and a sample containing NaOH, 5 mM glucose and 20 mM lactic acid are detected by Example 1, respectively. As results shown in FIG. 4, due to the setting of the selective layer, only the lactic acid can be detected by Example 1, which shows that the non-enzymatic sensor element with selectivity of the present disclosure has selectivity with the lactic acid.

Figure 5:
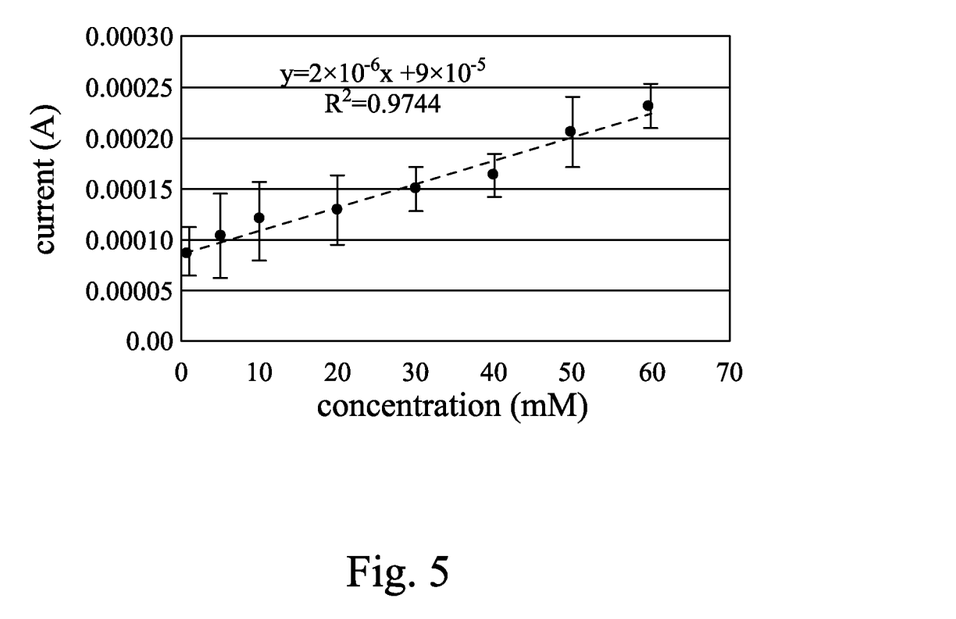
FIG. 5 is a graph of current-vs.-concentration for the lactic acid detected by Example 1 of the present disclosure.

Please refer to FIG. 5. FIG. 5 is a graph of current-vs.-concentration for the lactic acid detected by Example 1 of the present disclosure. In FIG. 5, samples containing different lactic acid concentrations are detected by Example 1 in amperometry. Each of the samples contains different concentrations of lactic acid and contains 5 mM uric acid, 25 µM ascorbic acid, 100 µM glucose and 10 µM dopamine. Each of the samples is tested by three times, and the average value is taken for the graph.

Please refer to Table 1 as follow. Table 1 describes the detecting data of the lactic acid detected by Example 1.

TABLE 1

| Concentration (mM) | first time | second time | third time | average |
|---|---|---|---|---|
| | | Current (A) × $10^{-5}$ | | |
| 1 | 7.95 | 6.5 | 12.2 | 8.88 |
| 5 | 9.31 | 6.05 | 15.9 | 10.4 |
| 10 | 10.3 | 8.06 | 17.2 | 11.9 |
| 20 | 11.0 | 10.2 | 17.8 | 13.0 |
| 30 | 13.9 | 13.2 | 18.1 | 15.1 |
| 40 | 16.3 | 13.8 | 19.0 | 16.4 |
| 50 | 16.1 | 21.4 | 24.5 | 20.7 |
| 60 | 21.4 | 22.0 | 26.2 | 23.2 |

As shown in FIG. 5 and Table 1, the concentration of the lactic acid is positively correlated with the current. That is, when the concentration of the lactic acid increases, the current detected by Example 1 increase accordingly. The $R^2$ of linear function in FIG. 5 is 0.9744. It shows that Example 1 can exclude the interference of other substances in the mixed solution with various organic molecules and has selectivity with the lactic acid, and the concentration of the lactic acid can be successfully detected.

Figure 6:
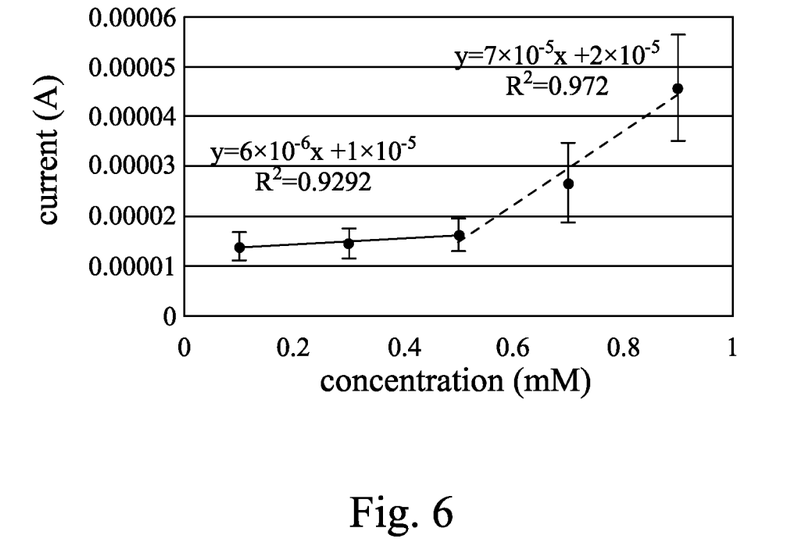
FIG. 6 is a graph of current-vs.-concentration for the uric acid detected by Example 2 of the present disclosure.

Please refer to FIG. 6. FIG. 6 is a graph of current-vs.-concentration for the uric acid detected by Example 2 of the present disclosure. In FIG. 6, samples containing different uric acid concentrations are detected by Example 2 in amperometry. Each of the samples contains 1.5 mM lactic acid, 125 µM ascorbic acid, 6 µM glucose, 5 µM dopamine, 0.1 M PBS and different concentrations of uric acid. Each of the samples is tested by three times, and the average value is taken for the graph.

Please refer to Table 2 as follow. Table 2 describes the detecting data of the uric acid detected by Example 2.

TABLE 2

| Concentration (mM) | first time | second time | third time | average |
|---|---|---|---|---|
| | | Current (A) × $10^{-5}$ | | |
| 0.1 | 1.80 | 1.30 | 1.12 | 1.41 |
| 0.3 | 1.88 | 1.35 | 1.17 | 1.47 |
| 0.5 | 2.08 | 1.51 | 1.32 | 1.64 |
| 0.7 | 3.78 | 2.30 | 1.95 | 2.68 |
| 0.9 | 6.03 | 4.22 | 3.50 | 4.58 |

As shown in FIG. 6 and Table 2, the concentration of the uric acid in the range of 0.1 mM to 0.5 mM and 0.5 mM to 0.9 mM are positively correlated with the current. That is, when the concentration of the uric acid increases, the current detected by Example 2 increases accordingly. Further, in the range of 0.1 mM to 0.5 mM, the $R^2$ of linear function in FIG. 6 is 0.9292, and in the range of 0.5 mM to 0.9 mM, the linear function $R^2$ in FIG. 6 is 0.972. It shows that Example 2 can exclude the interference of other substances in the mixed solution with various organic molecules and has selectivity with the uric acid, and the concentration of the uric acid can be successfully detected.

Figure 7:
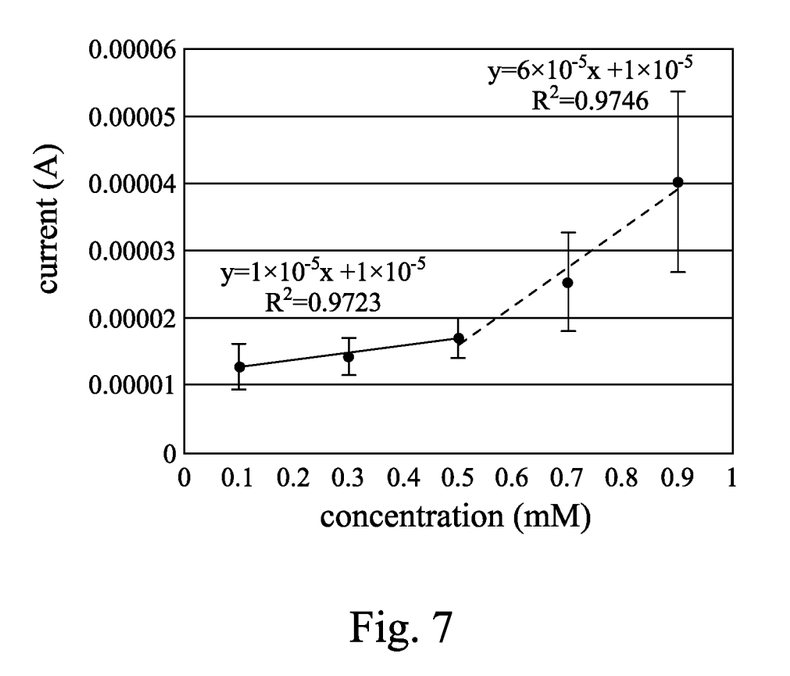
FIG. 7 is another graph of current-vs.-concentration for the uric acid detected by Example 2 of the present disclosure.

Please refer to FIG. 7. FIG. 7 is another graph of current-vs.-concentration for the uric acid detected by Example 2 of the present disclosure. In FIG. 7, the samples containing different uric acid concentrations are detected by Example 2 in amperometry, and the content of each sample in FIG. 7 is the same as the content of the samples in FIG. 6. Specially, in FIG. 7, four non-enzymatic sensor elements with selectivity of Example 2 are used to sense one sample, and the average value is taken for the graph.

Please refer to Table 3 as follow. Table 3 describes the detecting data of the uric acid detected by Example 2.

TABLE 3

| Concentration (mM) | No. 1 | No. 2 | No. 3 | No. 4 | average |
|---|---|---|---|---|---|
| | | Current (A) × $10^{-5}$ | | | |
| 0.1 | 0.858 | 1.80 | 1.30 | 1.12 | 1.27 |
| 0.3 | 1.28 | 1.88 | 1.35 | 1.17 | 1.42 |
| 0.5 | 1.87 | 2.08 | 1.51 | 1.32 | 1.70 |
| 0.7 | 2.10 | 3.78 | 2.30 | 1.95 | 2.53 |
| 0.9 | 2.33 | 6.03 | 4.22 | 3.50 | 4.02 |

As shown in FIG. 7 and Table 3, the concentration of the uric acid in the range of 0.1 mM to 0.5 mM and 0.5 mM to 0.9 mM are positively correlated with the current. Further, in the range of 0.1 mM to 0.5 mM, the $R^2$ of linear function in FIG. 7 is 0.9723, and in the range of 0.5 mM to 0.9 mM, the $R^2$ of linear function in FIG. 7 is 0.9746. It shows that the different non-enzymatic sensor element with selectivity of Example 2 can exclude the interference of other substances in the mixed solution with various organic molecules and has selectivity with the uric acid, and the concentration of the uric acid can be successfully detected.

Figure 8:
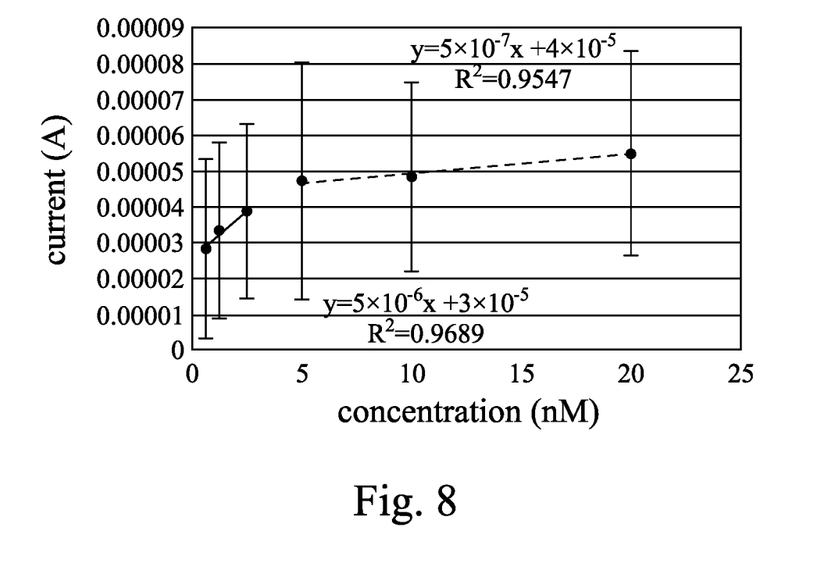
FIG. 8 is a graph of current-vs.-concentration for the miRNA detected by Example 3 of the present disclosure.

Please refer to FIG. 8. FIG. 8 is a graph of current-vs.-concentration for the miRNA detected by Example 3 of the present disclosure. In FIG. 8, samples containing different miRNA concentrations are detected by Example 3 in an electrochemical impedance spectroscopy. Each of the samples has different concentrations of the miRNA. Each of the samples is tested by three times, and the average value is taken for the graph.

Please refer to Table 4 as follow. Table 4 describes the detecting data of the miRNA detected by Example 3.

TABLE 4

| Concentration (nM) | first time | second time | third time | average |
|---|---|---|---|---|
| | | Current (A) × $10^{-5}$ | | |
| 0.625 | 1.93 | 6.26 | 0.307 | 2.83 |
| 1.25 | 2.18 | 6.76 | 1.10 | 3.35 |
| 2.5 | 2.50 | 7.31 | 1.83 | 3.88 |
| 5 | 2.53 | 9.42 | 2.27 | 4.74 |
| 10 | 3.28 | 8.55 | 2.69 | 4.84 |
| 20 | 3.75 | 9.54 | 3.23 | 5.50 |

As shown in FIG. 8 and Table 4, the concentration of the miRNA is positively correlated with the current. That is, when the concentration of the miRNA increases, the current detected by Example 3 increases accordingly. Further, in the range of 0.625 nM to 2.5 nM, the $R^2$ of linear function in FIG. 8 is 0.9689, and in the range of 5 nM to 20 nM, the $R^2$ of linear function in FIG. 8 is 0.9547. It shows that Example 3 can exclude the interference of other substances in the mixed solution with various organic molecules and has selectivity with the miRNA, and the concentration of the miRNA can be successfully detected.

In summary, in the non-enzymatic sensor element with selectivity and the non-enzymatic sensor of the present disclosure, the selective layer has a high affinity with the specific substance, so that the selective layer has selectivity with the specific substance, and the extraction function can be established. The target analyte passes through the selective layer and reacts with the catalyst of the catalyst layer, the interference of other substances can be excluded, and the single signal can be generated. Therefore, the non-enzymatic sensor element with selectivity and the non-enzymatic sensor can have selectivity. Further, the non-enzymatic sensor element with selectivity of the present disclosure has the advantages of unaffected by environmental factors, not easily losing activity and having a wide detection range.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A non-enzymatic sensor element with selectivity used to sense a concentration of a target analyte, comprising:
   a substrate; and
   an electrode assembly connected to the substrate and comprising a working electrode, a reference electrode and an auxiliary electrode, wherein the working electrode comprises:
      a conductive layer connected to the substrate;
      a catalyst layer connected to the conductive layer and comprising a catalyst for oxidizing the target analyte; and
      a selective layer connected to the catalyst layer and comprising an ionic liquid having a high affinity with the target analyte;
   wherein the target analyte passes through the selective layer and contacts with the catalyst layer, and the target analyte is oxidized by the catalyst.

2. The non-enzymatic sensor element with selectivity of claim 1, wherein the ionic liquid is connected to the catalyst layer in an electrografting manner.

3. The non-enzymatic sensor element with selectivity of claim 1, wherein a chemical structure of the ionic liquid has an attaching segment and an extracting segment, the attaching segment is connected with the catalyst layer through a covalent bond, and the extracting segment forms the high affinity with the target analyte.

4. The non-enzymatic sensor element with selectivity of claim 3, wherein the extracting segment comprises a phosphorus compound, an amine compound or an imidazole compound.

5. The non-enzymatic sensor element with selectivity of claim 3, wherein the attaching segment has an ethylenic bond.

6. The non-enzymatic sensor element with selectivity of claim 1, wherein the conductive layer comprises a metal or a conductive polymer.

7. The non-enzymatic sensor element with selectivity of claim 1, wherein the catalyst of the catalyst layer is a metal, a compound of the metal or a conductive polymer.

8. The non-enzymatic sensor element with selectivity of claim 1, wherein the working electrode further comprises a proton exchange membrane connected to the selective layer.

9. A non-enzymatic sensor, comprising:
   the non-enzymatic sensor element with selectivity of claim 1 for oxidizing a target analyte and generating a current; and
   a current sensor electrically connected to the non-enzymatic sensor element with selectivity and for converting the current to a detection result.

10. The non-enzymatic sensor of claim 9, wherein the detection result is a single signal.

\* \* \* \* \*